US011350477B2

United States Patent
Bai et al.

(10) Patent No.: US 11,350,477 B2
(45) Date of Patent: May 31, 2022

(54) CONTROL SIGNALING AFTER PRIMARY CELL LINK FAILURE

(71) Applicant: QUALCOMM Incorporated, San Diego, CA (US)

(72) Inventors: Tianyang Bai, Bridgewater, NJ (US); Tao Luo, San Diego, CA (US); Jung Ho Ryu, Fort Lee, NJ (US); Kiran Venugopal, Raritan, NJ (US); Yan Zhou, San Diego, CA (US); Xiao Feng Wang, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 16/790,317

(22) Filed: Feb. 13, 2020

(65) Prior Publication Data

US 2020/0314941 A1 Oct. 1, 2020

Related U.S. Application Data

(60) Provisional application No. 62/826,556, filed on Mar. 29, 2019.

(51) Int. Cl.
*H04W 76/19* (2018.01)
*H04L 5/00* (2006.01)
(Continued)

(52) U.S. Cl.
CPC .......... *H04W 76/19* (2018.02); *H04B 7/0695* (2013.01); *H04L 5/0055* (2013.01); *H04W 72/0413* (2013.01)

(58) Field of Classification Search
CPC . H04W 76/19; H04W 72/0413; H04W 76/15; H04W 24/10; H04W 72/042;
(Continued)

(56) References Cited

U.S. PATENT DOCUMENTS 10,123,318 B2 * 11/2018 Fujishiro ............... H04W 76/34
2013/0195063 A1 * 8/2013 Ahn ....................... H04L 1/1861
370/329

(Continued)

OTHER PUBLICATIONS

Huawei, et al., "RLF and PCell Change for Carrier Aggregation in NR," 3GPP Draft, 3GPP TSG-RAN WG2 Meeting #98, R2-1704867, RLF and PCell Change for Carrier Aggregation, 3rd Generation Partnership Project (3GPP), Mobile Competence Centre, 650, Route Des Lucioles, F-06921, Sophia-Antipolis Cedex, France, vol. RAN WG2, No. Hangzhou. China, May 15, 2017-May 19, 2017, May 14, 2017 (May 14, 2017), XP051275382, 2 pages, Retrieved from the Internet.

(Continued)

*Primary Examiner* — Vinncelas Louis
(74) *Attorney, Agent, or Firm* — Harrity & Harrity, LLP

(57) ABSTRACT

Various aspects of the present disclosure generally relate to wireless communication. In some aspects, a user equipment (UE) and/or a base station (BS) may identify in connection with a link failure of a primary cell, a resource in a secondary cell. The UE and/or the BS may communicate control signaling with the BS using the resource in the secondary cell as a response to the link failure of the primary cell. Numerous other aspects are provided.

30 Claims, 15 Drawing Sheets

(51) Int. Cl.
*H04W 72/04* (2009.01)
*H04B 7/06* (2006.01)

(58) Field of Classification Search
CPC ............. H04W 72/0453; H04W 76/34; H04L 5/0055; H04L 5/0053; H04L 5/0023; H04L 5/001; H04L 1/1812; H04L 1/1861; H04B 7/0695; H04B 7/022
See application file for complete search history.

(56) References Cited

U.S. PATENT DOCUMENTS

| | | | | |
|---|---|---|---|---|
| 2015/0280883 A1* | 10/2015 | Seo | ....................... | H04L 1/1861 370/329 |
| 2016/0262149 A1* | 9/2016 | Futaki | ................... | H04W 24/10 |
| 2017/0222763 A1* | 8/2017 | Lee | ....................... | H04L 1/1812 |
| 2020/0045702 A1* | 2/2020 | Chen | ................. | H04W 72/0453 |
| 2020/0229081 A1* | 7/2020 | Ang | ................... | H04W 72/0453 |
| 2021/0014104 A1* | 1/2021 | Chen | ...................... | H04W 76/19 |
| 2021/0058133 A1* | 2/2021 | Takeda | ................ | H04W 72/042 |

OTHER PUBLICATIONS

International Search Report and Written Opinion—PCT/US2020/018319—ISA/EPO—dated May 15, 2020.
LG Electronics Inc: "Supplementary SRB in MCG Failure for LTE-NR Interworking", 3GPP Draft, 3GPP TSG-RAN WG2 #97, R2-1701634, Supplementary SRB for LTE-NR Interworking, 3rd Generation Partnership Project (3GPP), Mobile Competence Centre, 650, Route Des Lucioles, F-06921, Sophia-Antipolis Cedex, France, vol. RAN WG2, No. Athens. Greece; Feb. 13, 2017-Feb. 17, 2017, Feb. 4, 2017 (Feb. 4, 2017), XP051223581, 3 pages, Retrieved from the Internet.

* cited by examiner

CONTROL SIGNALING AFTER PRIMARY CELL LINK FAILURE

CROSS-REFERENCE TO RELATED APPLICATION

This patent application claims priority to U.S. Provisional Patent Application No. 62/826,556, filed on Mar. 29, 2019, entitled "CONTROL SIGNALING AFTER PRIMARY CELL LINK FAILURE," and assigned to the assignee hereof. The disclosure of the prior application is considered part of and is incorporated by reference in this patent application.

FIELD OF THE DISCLOSURE

Aspects of the present disclosure generally relate to wireless communication, and to techniques and apparatuses for control signaling after primary cell link failure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include identifying, in connection with a link failure of a primary cell, a resource in a secondary cell associated with a base station (BS); and communicating control signaling with the BS using the resource in the secondary cell as a response to the link failure of the primary cell.

In some aspects, a method of wireless communication, performed by a BS, may include identifying, in connection with a link failure of a primary cell, a resource in a secondary cell; and communicating control signaling with a UE using the resource for control signaling in the secondary cell as a response to the link failure of the primary cell.

In some aspects, a UE for wireless communication may include memory and one or more processors operatively coupled to the memory. The memory and the one or more processors may be configured to one or more memories; and one or more processors communicatively coupled to the one or more memories, configured to: identify, in connection with a link failure of a primary cell, a resource in a secondary cell associated with a BS; and communicate control signaling with the BS using the resource in the secondary cell as a response to the link failure of the primary cell.

In some aspects, a BS for wireless communication may include memory and one or more processors operatively coupled to the memory. The memory and the one or more processors may be configured to one or more memories; and one or more processors communicatively coupled to the one or more memories, configured to: identify, in connection with a link failure of a primary cell, a resource in a secondary cell; and communicate control signaling with a UE using the resource for control signaling in the secondary cell as a response to the link failure of the primary cell.

In some aspects, a non-transitory computer-readable medium may store one or more instructions for wireless communication. The one or more instructions, when executed by one or more processors of a UE, may cause the one or more processors to: identify, in connection with a link failure of a primary cell, a resource in a secondary cell associated with a BS; and communicate control signaling with the BS using the resource in the secondary cell as a response to the link failure of the primary cell.

In some aspects, a non-transitory computer-readable medium may store one or more instructions for wireless communication. The one or more instructions, when executed by one or more processors of a BS, may cause the one or more processors to: identify, in connection with a link failure of a primary cell, a resource in a secondary cell; and communicate control signaling with a UE using the resource for control signaling in the secondary cell as a response to the link failure of the primary cell.

In some aspects, an apparatus for wireless communication may include means for identifying, in connection with a link failure of a primary cell, a resource in a secondary cell associated with a BS; and means for communicating control signaling with the BS using the resource in the secondary cell as a response to the link failure of the primary cell.

In some aspects, an apparatus for wireless communication may include means for identifying, in connection with a link failure of a primary cell, a resource in a secondary cell; and means for communicating control signaling with a UE using the resource for control signaling in the secondary cell as a response to the link failure of the primary cell.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
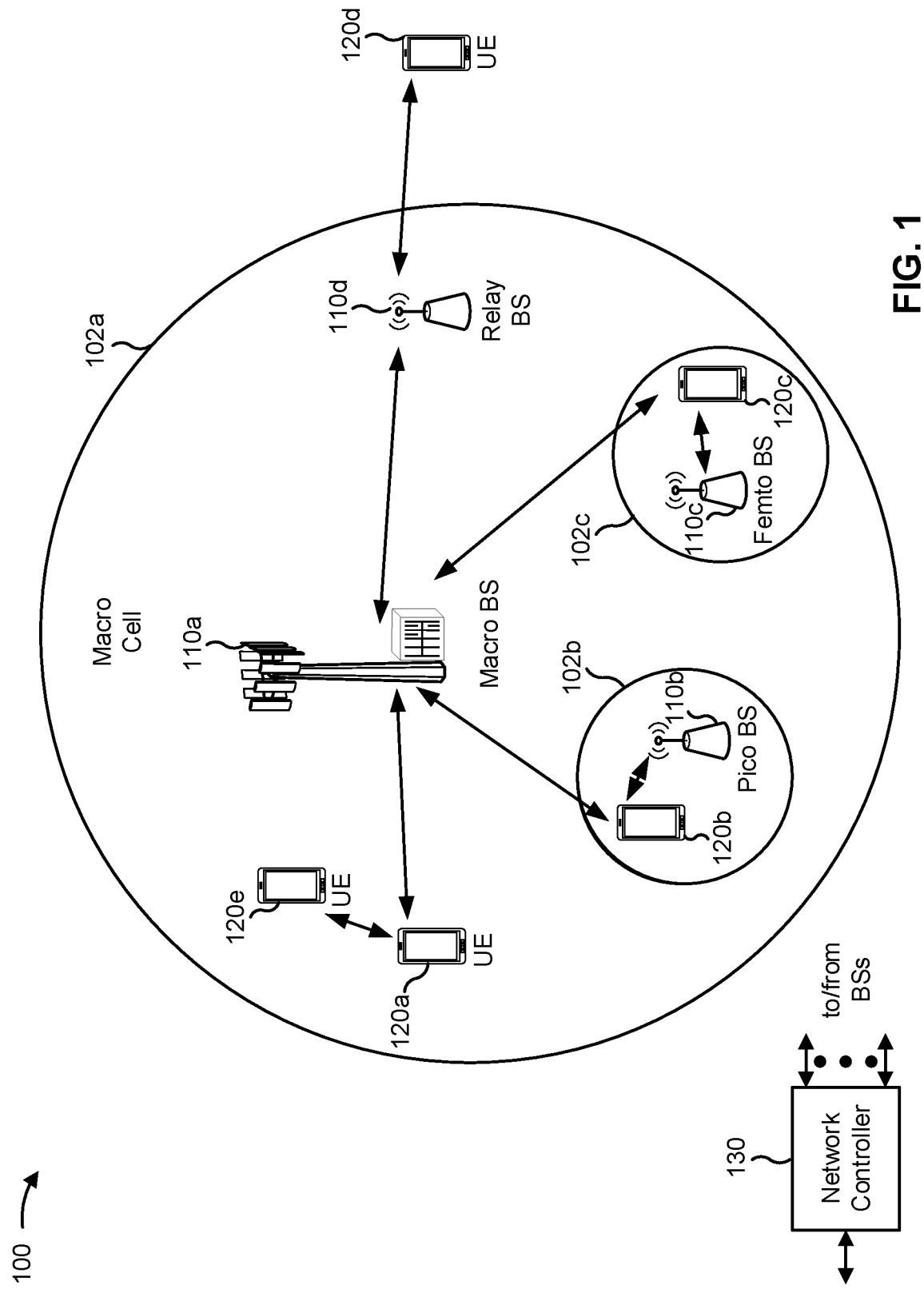
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

UEs 120 may communicate in a dual-connectivity mode that includes a primary cell associated with a first BS 110 and a secondary cell associated with a second BS 110. For example, the first BS 110 and the primary cell may enable control signaling for data transmissions of the second BS 110 and the secondary cell, which may increase a coverage area for a UE 120, a reliability of control signaling for the UE 120, and/or the like. However, when a link failure occurs for the primary cell, the UE 120 may fail to transmit or receive some control signals that are responses to communications on the secondary cell. For example, the UE 120 may fail to transmit an acknowledgement (ACK) on the primary cell for a physical downlink shared channel (PDSCH) transmitted to the UE 120 on the secondary cell. Thus, some aspects described herein enable switching, after a link failure, from using the primary cell for control signaling triggered by secondary cell communications to using the secondary cell for control signaling triggered by secondary cell communications. In this way, the UE 120 and the second BS 110 enable continued use of the secondary cell after link failure on the primary cell, thereby improving network performance, improving coverage area, reducing a likelihood of dropping communications, and/or the like.

As indicated above, FIG. 1 is provided as an example. Other examples may differ from what is described with regard to FIG. 1.

Figure 2:
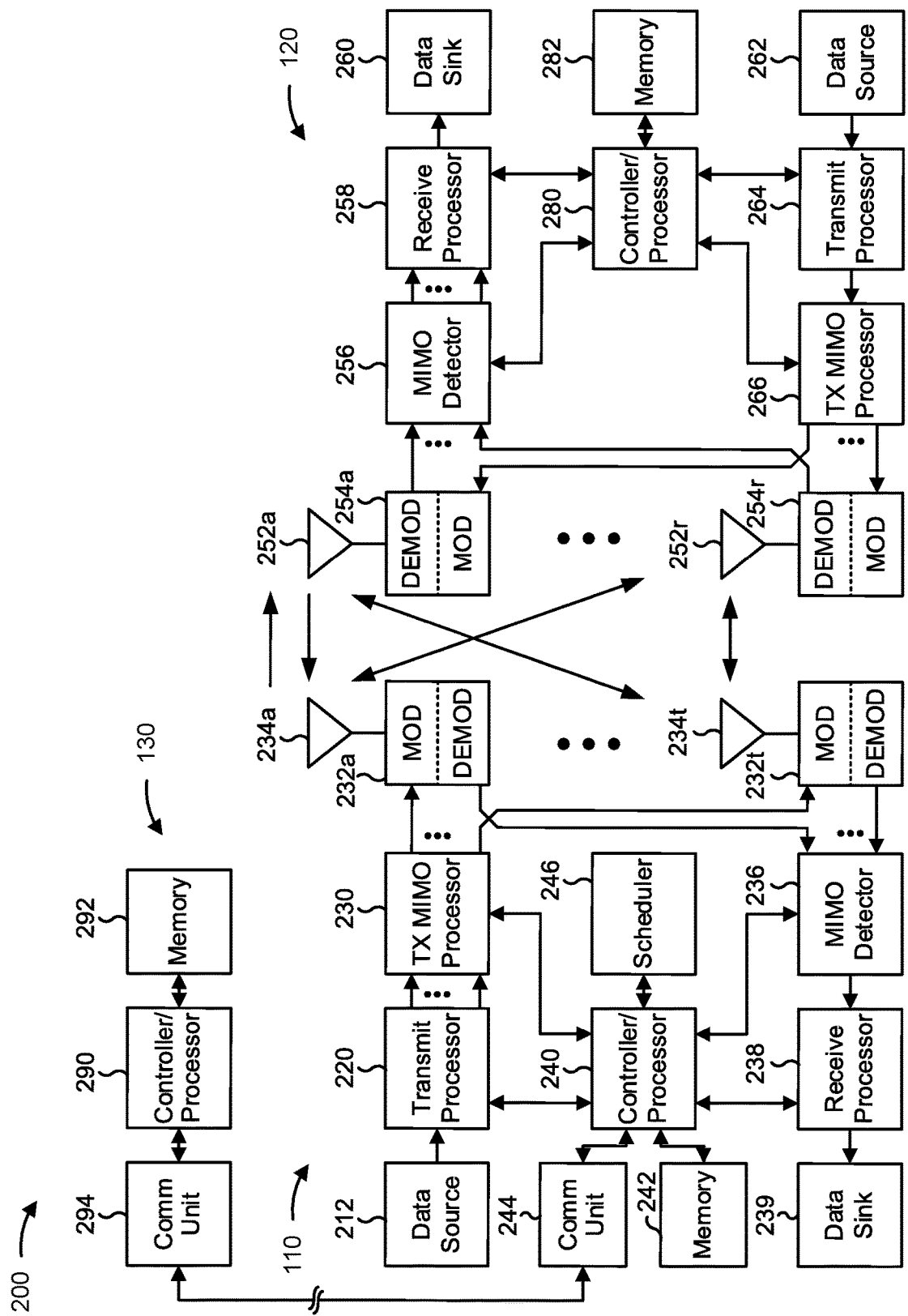
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with secondary cell control signaling after primary cell link failure, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for identifying, in connection with a link failure of a primary cell, a resource in a secondary cell associated with a base station (BS), means for communicating control signaling with the BS using the resource in the secondary cell as a response to the link failure of the primary cell, and/or the like. In some aspects, such means may include one or more components of UE 120 described in connection with FIG. 2.

In some aspects, base station 110 may include means for identifying, in connection with a link failure of a primary cell, a resource in a secondary cell, means for communicating control signaling with a user equipment (UE) using the resource for control signaling in the secondary cell as a response to the link failure of the primary cell, and/or the like. In some aspects, such means may include one or more components of base station 110 described in connection with FIG. 2.

As indicated above, FIG. 2 is provided as an example. Other examples may differ from what is described with regard to FIG. 2.

Figure 3A:
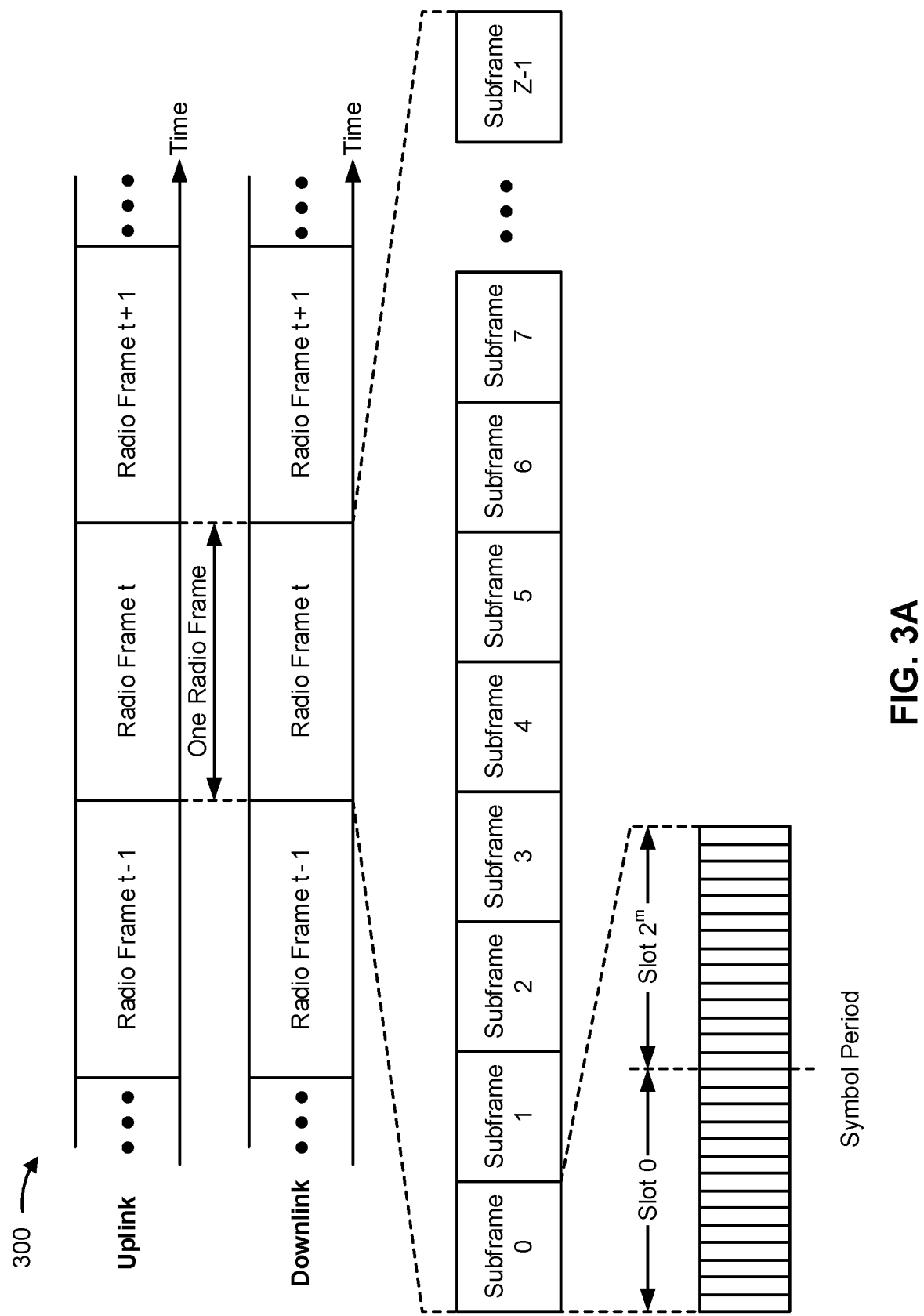
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z-1). Each subframe may have a predetermined duration (e.g., 1ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
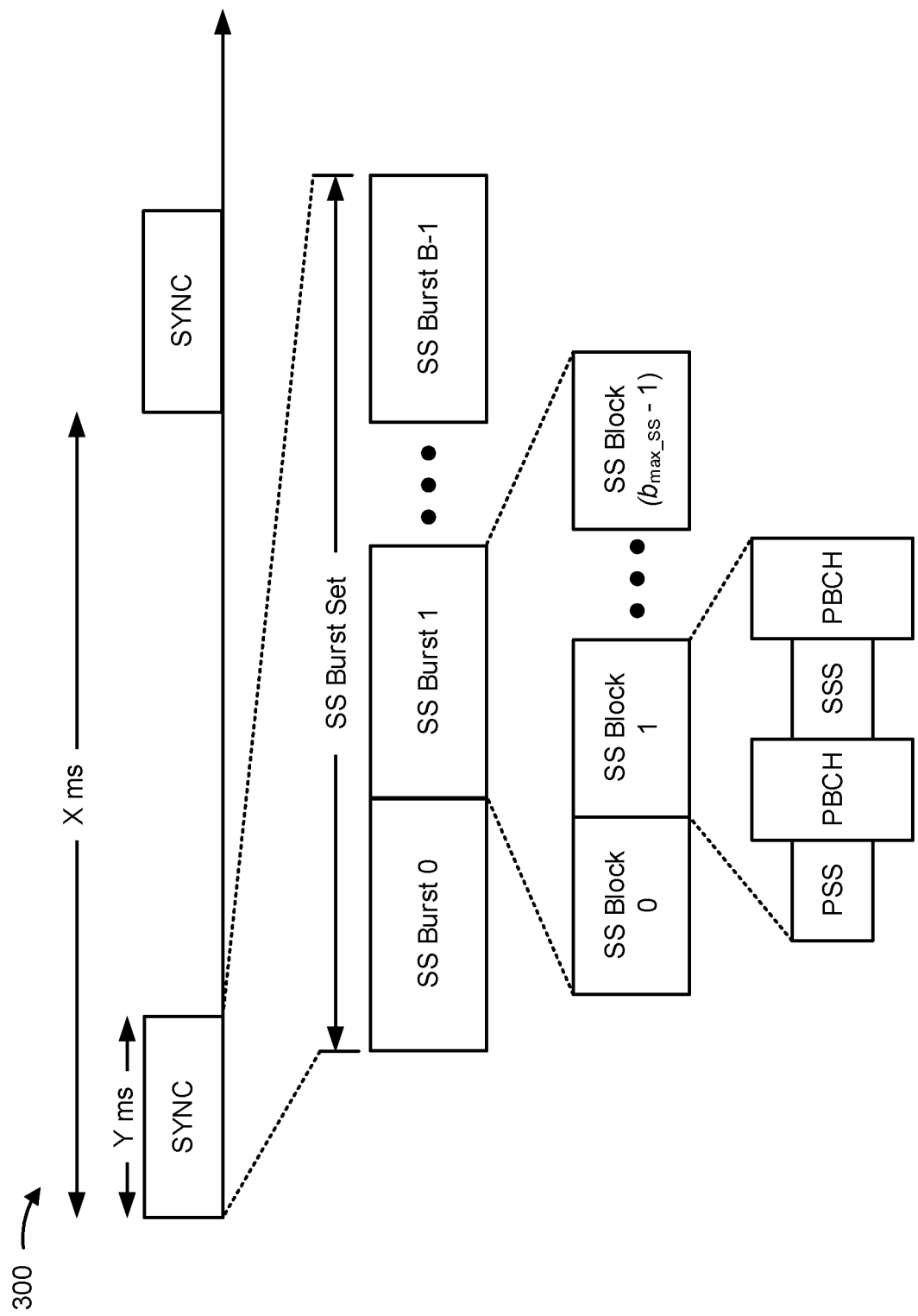
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS}$-1), where $b_{max\_SS}$-1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
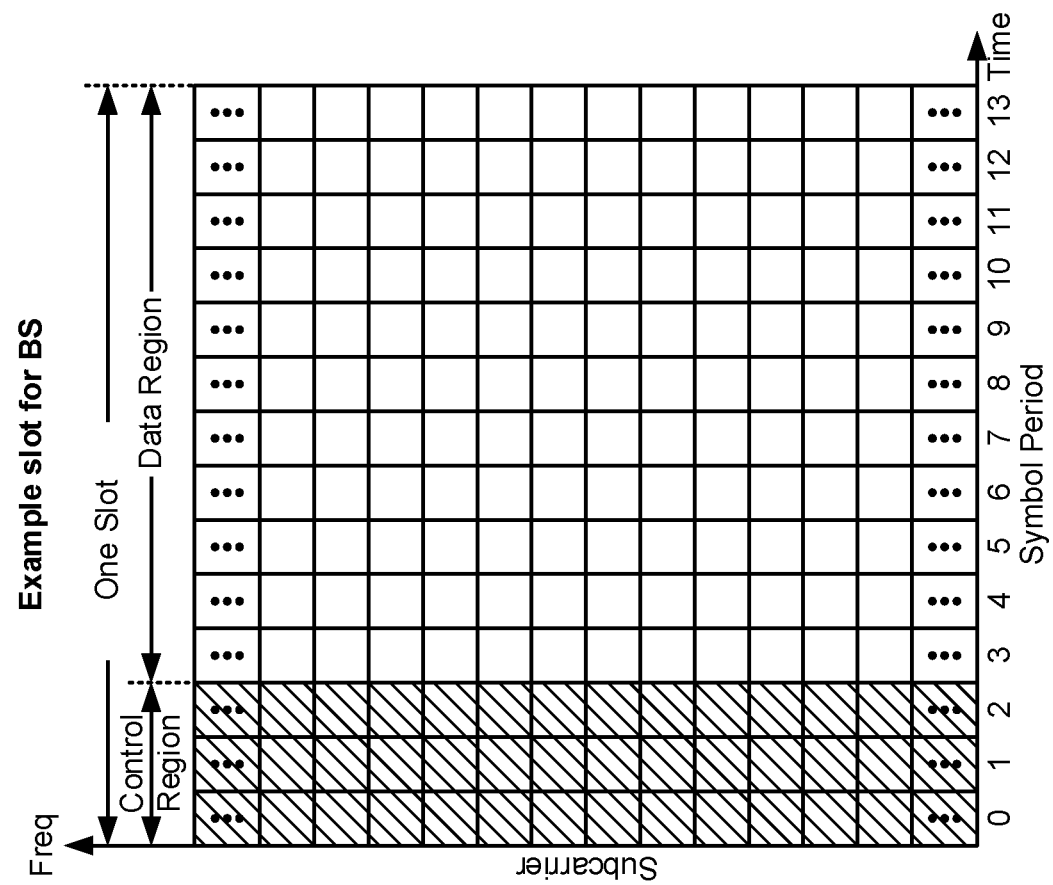
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
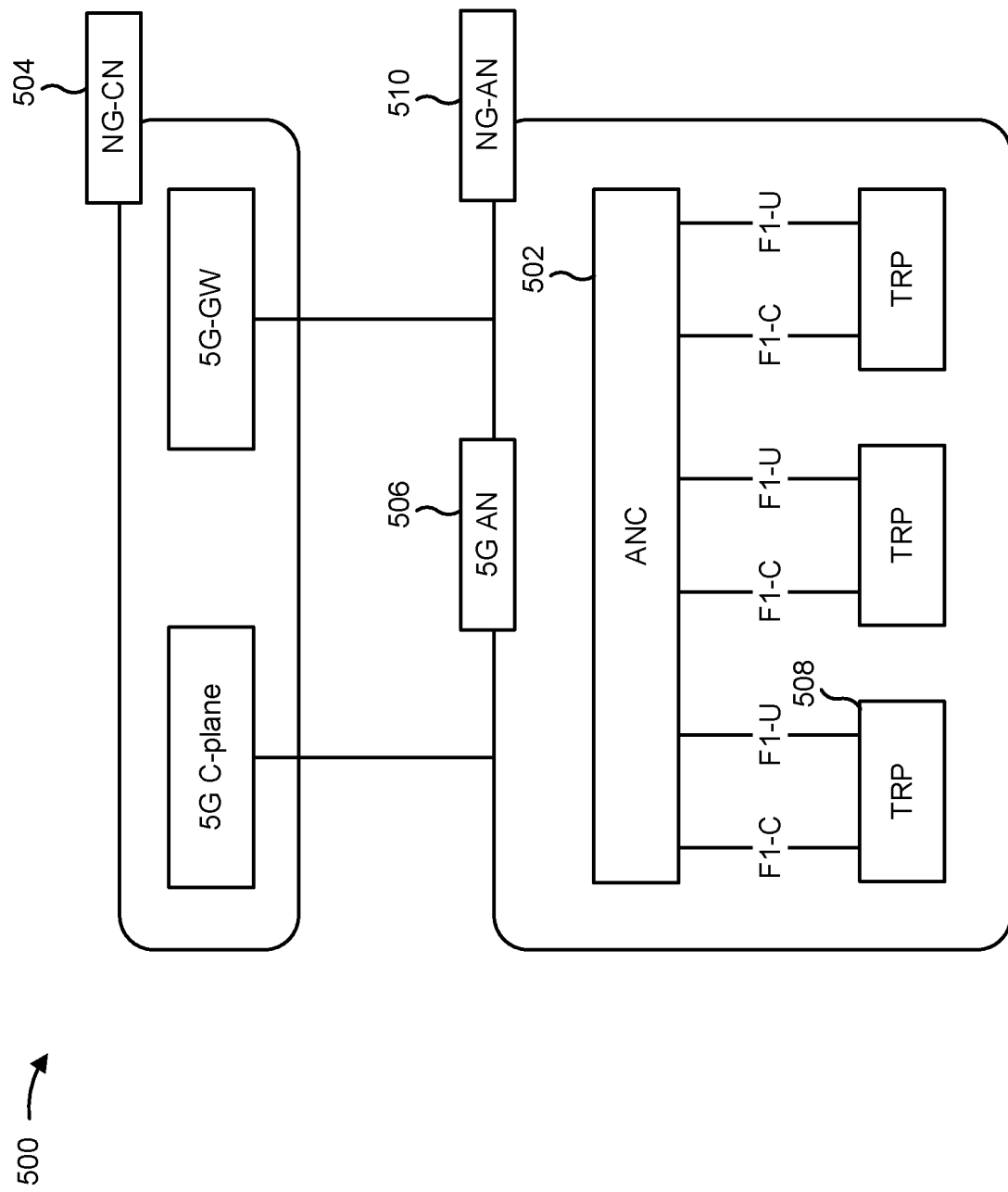
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
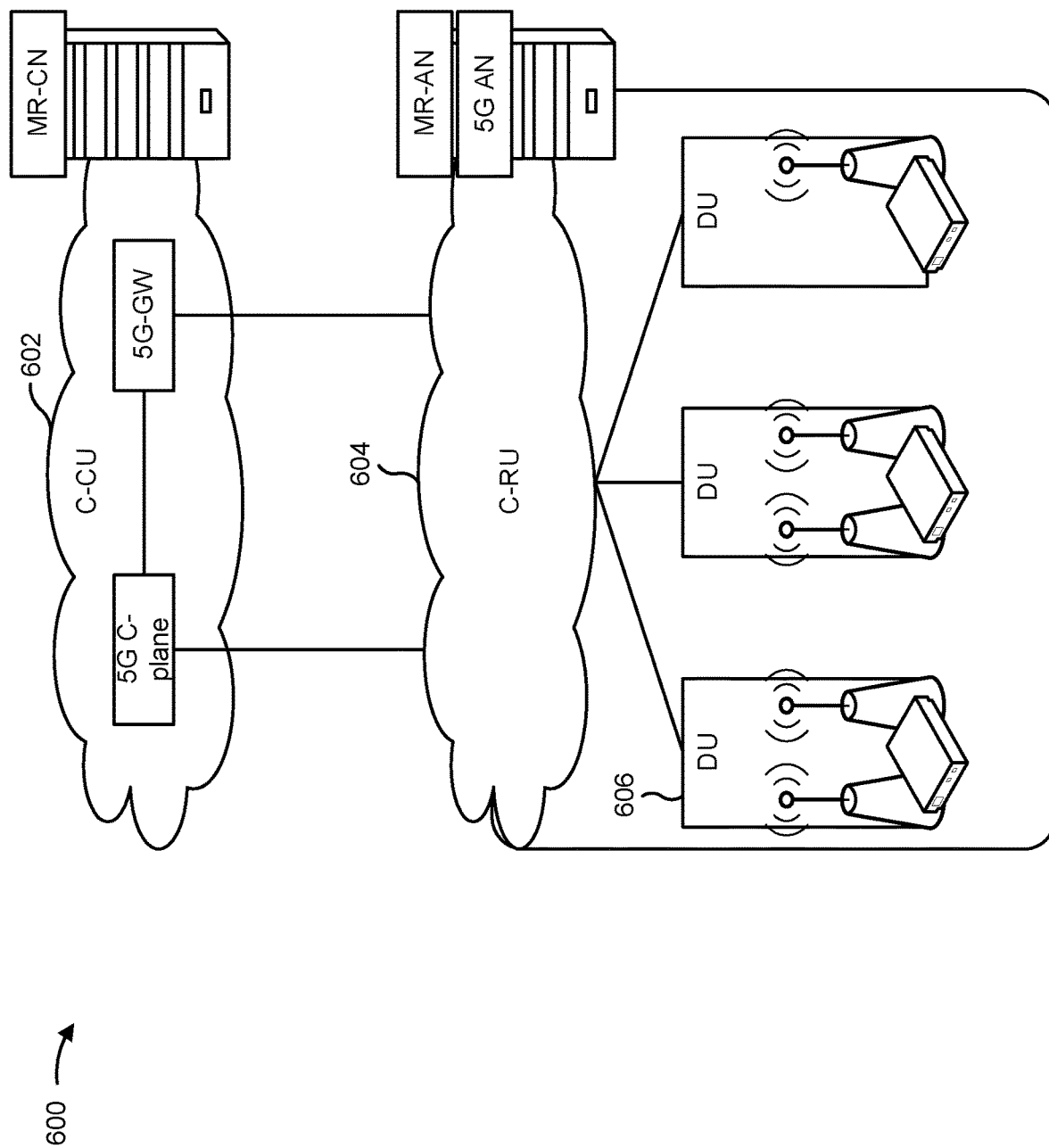
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

In some communications systems, such as in New Radio (NR) with a dual-connectivity mode, a user equipment (UE) may communicate with one or more base stations (BSs) associated with a plurality of cells. For example, the UE may communicate with a BS via a primary cell, a secondary cell, and/or the like. In some cases, the same BS may provide both the primary cell and the secondary cell. In other cases, a first BS may provide the primary cell and a second, different BS may provide the secondary cell.

When operating in a dual-connectivity mode, the UE may use a primary cell to transmit control signaling, such as an acknowledgement (ACK) signal, a negative acknowledgement (NACK) signal, and/or the like for the secondary cell. For example, the UE may receive a physical downlink shared channel (PDSCH) transmission on the secondary cell and may acknowledge the PDSCH transmission by transmitting an ACK on the primary cell.

A link failure may occur for the UE in connection with a primary cell while a connection to the secondary cell is unaffected. For example, the UE may detect a radio link failure (RLF) for the primary cell but may continue communicating with the secondary cell (e.g., the UE may continue to receive a PDSCH transmission). In this case, the UE may refrain from uplink transmission on the primary cell based at least in part on the radio link failure. As a result, the UE may forgo transmitting control signaling, which may prevent the UE from using the secondary cell even when the secondary cell has not undergone a link failure. For example, based at least in part on not transmitting an ACK or a NACK on a primary cell for received downlink traffic on the secondary cell, the BS associated with the secondary cell may be unable to determine whether the downlink traffic (e.g., the PDSCH) is successfully received or whether retransmission of the downlink traffic is required. Further, the UE may forgo receiving control signaling from the primary cell, which may prevent UE usage of the secondary cell.

Some aspects described herein enable secondary cell control signaling after primary cell link failure. For example, a UE and/or a BS may determine that a link failure has occurred for a primary cell of the UE and may identify a resource in the secondary cell for control signaling. In this case, the UE and the BS may communicate control signaling, that was to be communicated using the primary cell, using the resource in the secondary cell. For example, the UE may transmit an ACK, a NACK, a physical uplink control channel (PUCCH), and/or the like to the BS via the secondary cell. Further, the BS may transmit a PDCCH and/or the like to the UE via the secondary cell. In this case, the control signaling may enable the UE and the BS to continue to communicate data traffic and/or other traffic on the secondary cell.

In this way, the UE and the BS enable use of the secondary cell when the secondary cell has not undergone a link failure but the primary cell has undergone a link failure. Furthermore, by enabling continued use of the secondary cell, the UE and the BS enable an increased coverage area, increased bandwidth, reduced likelihood of dropped network traffic, and/or the like relative to ceasing use of the secondary cell when the primary cell has undergone a link failure.

Figure 7:
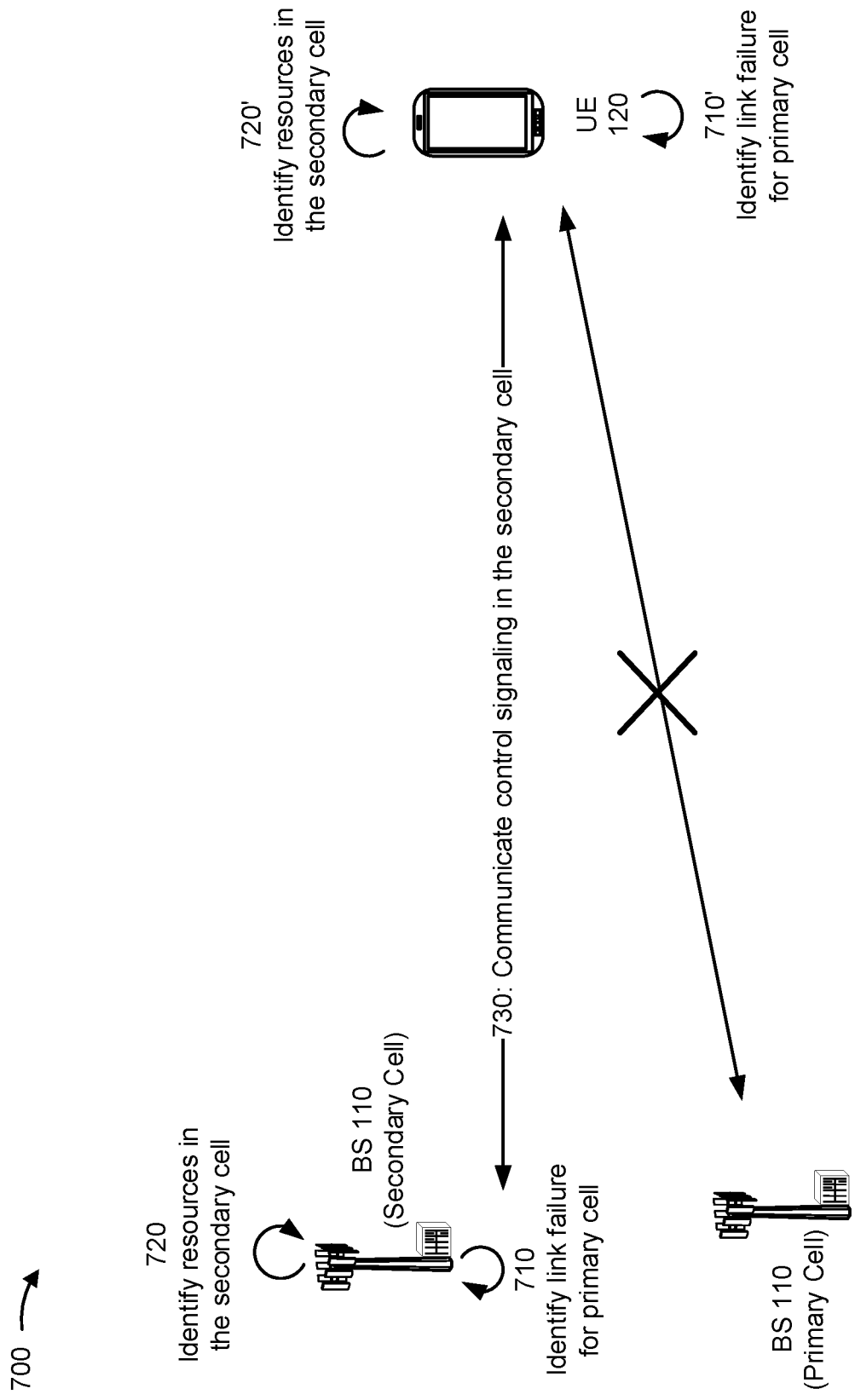
FIG. 7 is a diagram illustrating an example of secondary cell control signaling after primary cell link failure, in accordance with various aspects of the present disclosure.

FIG. 7 is a diagram illustrating an example 700 of secondary cell control signaling after primary cell link failure, in accordance with various aspects of the present disclosure. As shown in FIG. 7, example 700 includes a first BS 110 (associated with a primary cell), a second BS 110 (associated with a secondary cell), and a UE 120. In some aspects, the primary cell may be associated with a different BS than the secondary cell. For example, as shown, first BS 110 may communicate with UE 120 (before the link failure) on the primary cell and second BS 110 may communicate with UE 120 on the secondary cell. Alternatively, a single BS 110 may provide multiple cells. For example, second BS 110 may provide both the primary cell and the secondary cell.

As further shown in FIG. 7, and by reference numbers 710/710', second BS 110 (e.g., controller/processor 240, identification component 1306, and/or the like) and/or UE 120 (e.g., using controller/processor 280, identification component 1106, and/or the like) may identify a link failure for the primary cell. For example, UE 120 may detect a radio link failure, a beam failure, and/or the like associated with the primary cell. In some aspects, UE 120 may indicate the link failure to second BS 110. For example, UE 120 may detect the link failure on the primary cell and may transmit first control signaling on the secondary cell to indicate the link failure to second BS 110. In this case, the first control signaling may trigger second BS 110 to switch to transmitting and/or receiving subsequent second control signaling on the secondary cell. Additionally, or alternatively, first BS 110 may detect the link failure and may indicate the link failure to second BS 110 (e.g., via a backhaul). In this case, second BS 110 may transmit control signaling to UE 120 to indicate the link failure. Additionally, or alternatively, second BS 110 and UE 120 may each detect the link failure separately without communicating to identify the link failure (e.g., UE 120 may identify the link failure directly and second BS 110 may identify the link failure based at least in part on an indication from first BS 110).

In some aspects, UE 120 may communicate different types of communications on the primary cell and the secondary cell. For example, UE 120 may receive a physical downlink shared channel (PDSCH) on the secondary cell from second BS 110 and may transmit control signaling for the PDSCH (e.g., an acknowledgement (ACK) or a negative acknowledgement (NACK) of the PDSCH) on the primary cell. In this case, when UE 120 identifies the link failure, UE 120 may switch to transmitting and/or receiving the control signaling, which was being transmitted or was to be transmitted on the primary cell, on the secondary cell to avoid an interruption to other communication (e.g., the PDSCH transmission), which may require corresponding control signaling, on the secondary cell.

As further shown in FIG. 7, and by reference numbers 720/720', second BS 110 (e.g., using controller/processor 240, identification component 1306, and/or the like) and/or UE 120 (e.g., using controller/processor 280, identification component 1106, and/or the like) may identify resources in the secondary cell for communicating control signaling. For example, second BS 110 may determine one or more available resources and may signal the one or more available resources to UE 120 (e.g., using the secondary cell). Additionally, or alternatively, UE 120 and/or BS 110 may determine the one or more available resources based at least in part on a stored configuration identifying resources to use in a secondary cell when a primary cell is associated with a link failure. In this case, UE 120 and BS 110 may determine the one or more available resources without communicating to signal the one or more available resources. In some aspects, the one or more available resources may include physical uplink control channel (PUCCH) resources.

As further shown in FIG. 7, and by reference number 730, second BS 110 (e.g., using antenna 234, DEMOD 232, MIMO detector 236, receive processor 238, controller/processor 240, transmit processor 220, TX MIMO processor 230, MOD 232, reception component 1304, transmission component 1310, and/or the like) and UE 120 (e.g., using antenna 252, DEMOD 254, MIMO detector 256, receive processor 258, controller/processor 280, transmit processor 264, TX MIMO processor 266, MOD 254, reception component 1104, transmission component 1110, and/or the like) may communicate control signaling using the secondary cell. For example, second BS 110 may transmit control signaling and UE 120 may receive the control signaling. Additionally, or alternatively, UE 120 may transmit control signaling and second BS 110 may receive the control signaling. In some aspects, the control signaling may be a same type of control signaling as prior control signaling using the primary cell. For example, at an earlier time, UE 120 may transmit an ACK message on the primary cell for a PDSCH on the secondary cell and may, after a link failure of the primary cell, switch to transmitting subsequent ACK messages on the secondary cell for PDSCHs on the secondary cell. Additionally, or alternatively, UE 120 may transmit and/or receive one or more other types of control signaling. For example, control signaling types that the UE 120 may transmit and/or receive may include one or more of an ACK or NACK for communications on the primary cell, an ACK or NACK for communications on the secondary cell, channel state information for the primary cell, channel state information for the secondary cell, beam information for the primary cell, beam information for the secondary cell, a PDCCH, a PUCCH, a PUSCH or PDSCH carrying control information, and/or the like.

In some aspects, second BS 110 may transmit the PDCCH to UE 120 to trigger UE 120 to perform a beam sweeping procedure as part of a beam failure recovery procedure. In this way, UE 120 uses the secondary cell for control signaling to avoid an interruption to communication (e.g., the PDSCH) on the secondary cell as a result of a failure to successfully communicate control signaling on the primary cell. Moreover, based at least in part on switching to using the secondary cell for control signaling, second BS 110 and UE 120 enable performance of a beam failure recovery procedure.

In some aspects, UE 120 may transmit the control signaling to second BS 110 and/or receive the control signaling from second BS 110 as a response to other signaling from or to second BS 110. For example, second BS 110 may transmit a PDSCH to UE 120 on the secondary cell, which may trigger UE 120 to transmit an ACK or a NACK on the secondary cell as a response. In another example, the second BS 110 may transmit a PDCCH to UE 120 on the secondary cell, which may cause UE 120 to transmit and/or to receive the control signaling on the secondary cell of the second BS 110.

Additionally, or alternatively, the other signaling may be downlink data or control signaling for the primary cell (e.g., that was received via the primary cell before a link failure or that was re-directed to the secondary cell based at least in part on the link failure). Additionally, or alternatively, the other signaling may be downlink data or control signaling for the secondary cell. For example, UE 120 may transmit control signaling that is a response to a data transmission on the secondary cell or a control transmission on the secondary cell.

In some aspects, UE 120, first BS 110, and/or second BS 110 may perform a beam failure recovery procedure for the primary cell. For example, UE 120 and first BS 110 may perform the beam failure recovery procedure for the primary cell to recover from the link failure. In this case, UE 120 may transmit and/or receive information on the secondary cell and/or the primary cell to perform the beam failure recovery procedure. For example, the beam failure recovery procedure may include UE 120 receiving control signaling on the secondary cell (e.g., a PDCCH) from second BS 110, which may trigger UE 120 to perform beam sweeping to detect beams of the primary cell. In this case, UE 120 may detect one or more beams of the primary cell and may select at least one beam for communication with first BS 110. Based at least in part on selecting one or more beams, UE 120 may transmit an indication of the selected beam (e.g., to second BS 110 for relay to first BS 110 to enable first BS 110 and UE 120 to establish a connection).

In some aspects, based at least in part on performing the beam failure recovery procedure, UE 120 may switch from using the secondary cell for control signaling to using the primary cell for control signaling. For example, UE 120 may switch from transmitting ACKs or NACKs associated with secondary cell PDSCH transmissions on the secondary cell to transmitting the ACKs or NACKs on the primary cell for secondary cell PDSCH transmissions. In some aspects, UE 120 may switch to using the primary cell based at least in part on first BS 110 and/or second BS 110 transmitting signaling to UE 120 indicating that UE 120 is to switch to using the primary cell. Additionally, or alternatively, UE 120 may switch to using the primary cell after a threshold period of time elapses.

As indicated above, FIG. 7 is provided as an example. Other examples may differ from what is described with respect to FIG. 7.

Figure 8:
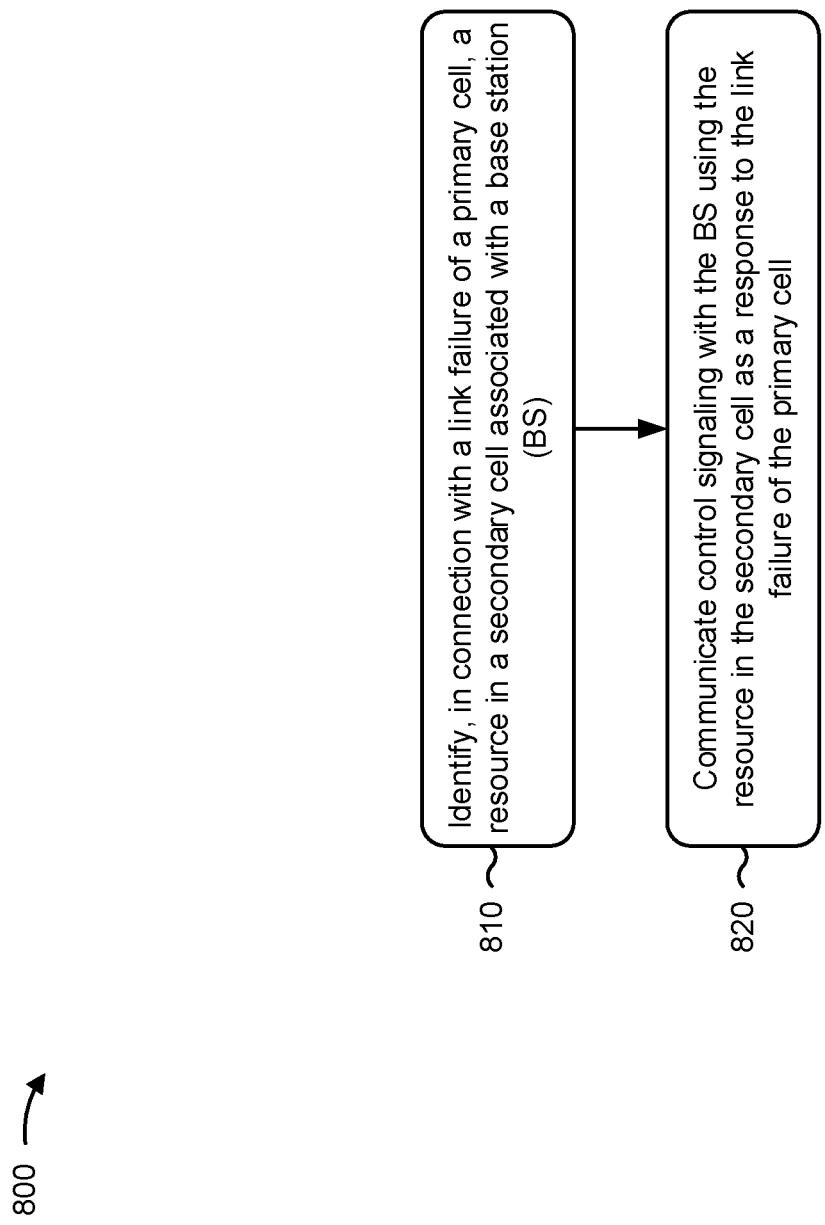
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120, apparatus 1102/1102', and/or the like) performs operations associated with secondary cell control signaling after primary cell link failure.

As shown in FIG. 8, in some aspects, process 800 may include identifying, in connection with a link failure of a primary cell, a resource in a secondary cell associated with a base station (BS) (block 810). For example, the UE (e.g., using receive processor 258, transmit processor 264, controller/processor 280, memory 282, identification component 1106, and/or the like) may identify, in connection with a link failure of a primary cell, a resource in a secondary cell associated with a base station (BS), as described above.

As further shown in FIG. 8, in some aspects, process 800 may include communicating control signaling with the BS using the resource in the secondary cell as a response to the link failure of the primary cell (block 820). For example, the UE (e.g., using receive processor 258, transmit processor 264, controller/processor 280, memory 282, reception component 1104, transmission component 1110, and/or the like) may communicate control signaling with the BS using the resource in the secondary cell as a response to the link failure of the primary cell, as described above.

Process 800 may include additional aspects, such as any single implementation or any combination of aspects described below and/or in connection with one or more other processes described elsewhere herein.

In a first aspect, the control signaling includes at least one of an acknowledgement (ACK) communication, a negative acknowledgement (NACK) communication, a physical downlink control channel (PDCCH) communication, or a physical uplink control channel (PUCCH) communication. In a second aspect, alone or in combination with the first aspect, the ACK communication or NACK communication is a response to a secondary cell physical downlink shared channel (PDSCH) communication. In a third aspect, alone or in combination with any one or more of the first and second aspects, identifying the resource in the secondary cell includes determining the resource in the secondary cell based at least in part on receiving an indication of the resource in the secondary cell from the BS or based at least in part on a stored configuration.

In a fourth aspect, alone or in combination with any one or more of the first through third aspects, communicating the control signaling includes communicating the control signaling as a response to other signaling from the BS. In a fifth aspect, alone or in combination with any one or more of the first through fourth aspects, process 800 may include transmitting other signaling to report the link failure of the primary cell. In a sixth aspect, alone or in combination with any one or more of the first through fifth aspects, process 800 may include receiving other signaling to trigger the control signaling of a physical downlink control channel (PDCCH) on the secondary cell.

In a seventh aspect, alone or in combination with any one or more of the first through sixth aspects, process 800 may include performing a beam failure recovery procedure in the primary cell after the link failure of the primary cell. In an eighth aspect, alone or in combination with any one or more of the first through seventh aspects, process 800 may include switching from using the secondary cell for communication to using the primary cell for communication. In a ninth aspect, alone or in combination with any one or more of the first through eighth aspects, the UE is configured to switch to using the primary cell for subsequent control signaling based at least in part on at least one of recovery of the primary cell, receipt of signaling from the BS, or elapse of a threshold period of time.

In a tenth aspect, alone or in combination with any one or more of the first through ninth aspects, the link failure of the primary cell is one of a radio link failure or a beam failure. In an eleventh aspect, alone or in combination with any one or more of the first through tenth aspects, communicating the control signaling includes transmitting or receiving the control signaling. In a twelfth aspect, alone or in combination with any one or more of the first through eleventh aspects, the control signaling is of a same type as prior control signaling and process 800 includes communicating the prior control signaling with the BS using the primary cell.

In a thirteenth aspect, alone or in combination with any one or more of the first through twelfth aspects, the BS is associated with the secondary cell, and the primary cell is associated with a different BS. In a fourteenth aspect, alone or in combination with any one or more of the first through thirteenth aspects, process 800 includes identifying the link failure. In a fifteenth aspect, alone or in combination with any one or more of the first through fourteenth aspects, the other signaling is at least one of downlink data associated with the primary cell, control signaling associated with the primary cell, downlink data associated with the secondary cell, or other control signaling associated with the secondary cell.

In a sixteenth aspect, alone or in combination with one or more of the first through fifteenth aspects, the resource in the secondary cell is a physical uplink control channel resource. In a seventeenth aspect, alone or in combination with one or more of the first through sixteenth aspects, process 800 includes requesting, in the secondary cell, to trigger the beam failure recovery procedure; and communicating one or more other beam failure recovery procedure messages in the primary cell.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
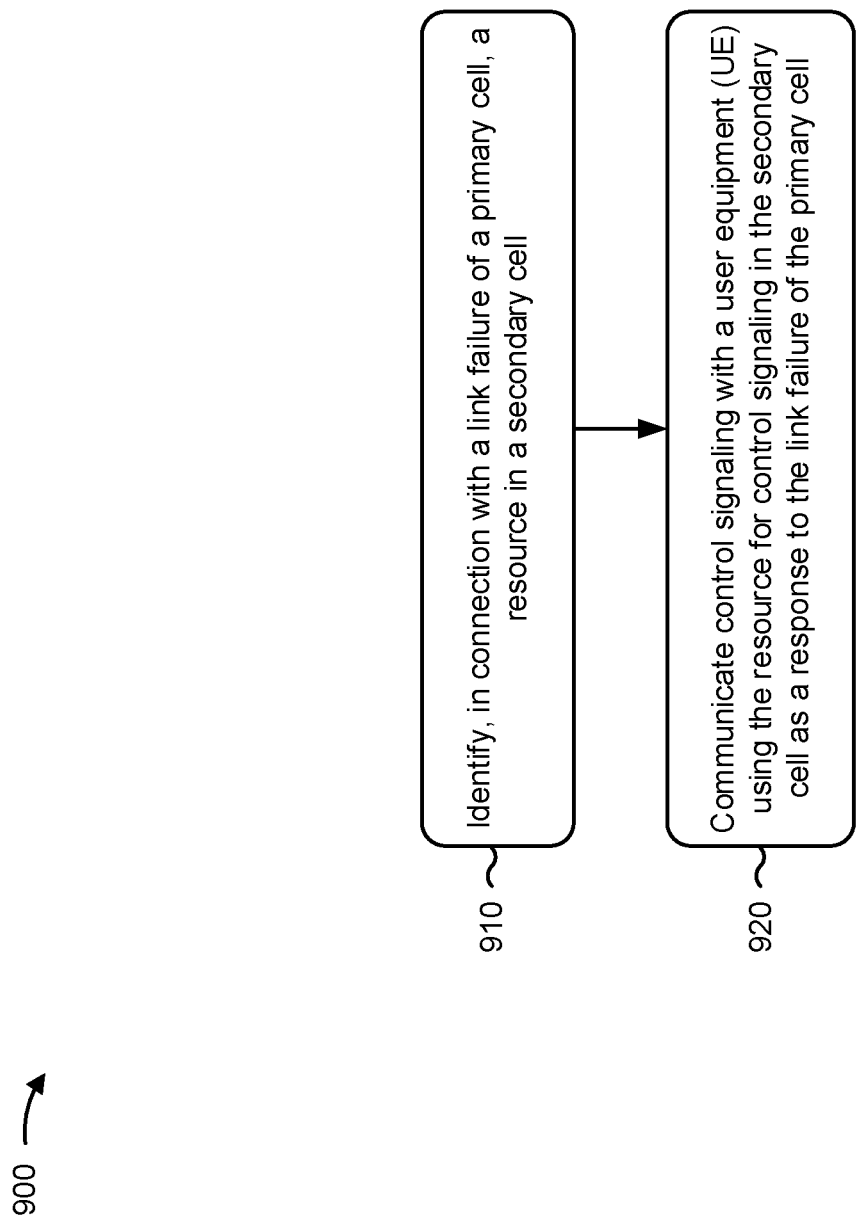
FIG. 9 is a diagram illustrating an example process performed, for example, by a base station, in accordance with various aspects of the present disclosure.

FIG. 9 is a diagram illustrating an example process 900 performed, for example, by a BS, in accordance with various aspects of the present disclosure. Example process 900 is an example where a BS (e.g., BS 110, apparatus 1302/1302', and/or the like) performs operations associated with secondary cell control signaling after primary cell link failure.

As shown in FIG. 9, in some aspects, process 900 may include identifying, in connection with a link failure of a primary cell, a resource in a secondary cell (block 910). For example, the BS (e.g., using transmit processor 220, receive processor 238, controller/processor 240, memory 242, identification component 1306, and/or the like) may identify, in connection with a link failure of a primary cell, a resource in a secondary cell, as described above.

As further shown in FIG. 9, in some aspects, process 900 may include communicating control signaling with a user equipment (UE) using the resource for control signaling in the secondary cell as a response to the link failure of the primary cell (block 920). For example, the BS (e.g., using transmit processor 220, receive processor 238, controller/processor 240, memory 242, reception component 1304, transmission component 1310, and/or the like) may communicate control signaling with a user equipment (UE) using the resource for control signaling in the secondary cell as a response to the link failure of the primary cell, as described above.

Process 900 may include additional aspects, such as any single implementation or any combination of aspects described below and/or in connection with one or more other processes described elsewhere herein.

In a first aspect, process 900 may include identifying the link failure of the primary cell, and identifying the resource may include identifying the resource based at least in part on identifying the link failure. In a second aspect, alone or in combination with the first aspect, the BS is configured to identify the link failure based at least in part on other signaling received via the secondary cell. In a third aspect, alone or in combination with any one or more of the first and second aspects, the link failure is one of a radio link failure or a beam failure.

In a fourth aspect, alone or in combination with any one or more of the first through third aspects, the control signaling includes at least one of an acknowledgement (ACK) communication, a negative acknowledgement (NACK) communication, a physical downlink control signal (PDCCH) communication, or a physical uplink shared channel (PUSCH) communication. In a fifth aspect, alone or in combination with any one or more of the first through fourth aspects, the ACK communication or NACK communication is a response to a secondary cell physical downlink shared channel (PDSCH) communication. In a sixth aspect, alone or in combination with any one or more of the first through fifth aspects, process 900 may include transmitting an indication of the resource in the secondary cell to the UE to identify the resource in the secondary cell.

In a seventh aspect, alone or in combination with any one or more of the first through sixth aspects, the BS is configured to transmit the indication of the resource based at least in part on a radio link failure report received from the UE. In an eighth aspect, alone or in combination with any one or more of the first through seventh aspects, process 900 may include performing a beam failure recovery procedure in the primary cell after the link failure of the primary cell. In a ninth aspect, alone or in combination with any one or more of the first through eighth aspects, process 900 may include switching from using the secondary cell for communication to using the primary cell for communication.

In a tenth aspect, alone or in combination with any one or more of the first through ninth aspects, process 900 may include transmitting signaling to the UE to indicate a switch to using the primary cell for communication. In an eleventh aspect, alone or in combination with any one or more of the first through tenth aspects, communicating the control signaling includes transmitting or receiving the control signaling. In a twelfth aspect, alone or in combination with any one or more of the first through eleventh aspects, the control signaling is of a same type as prior control signaling communicated between the UE and the BS or another BS different from the BS.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
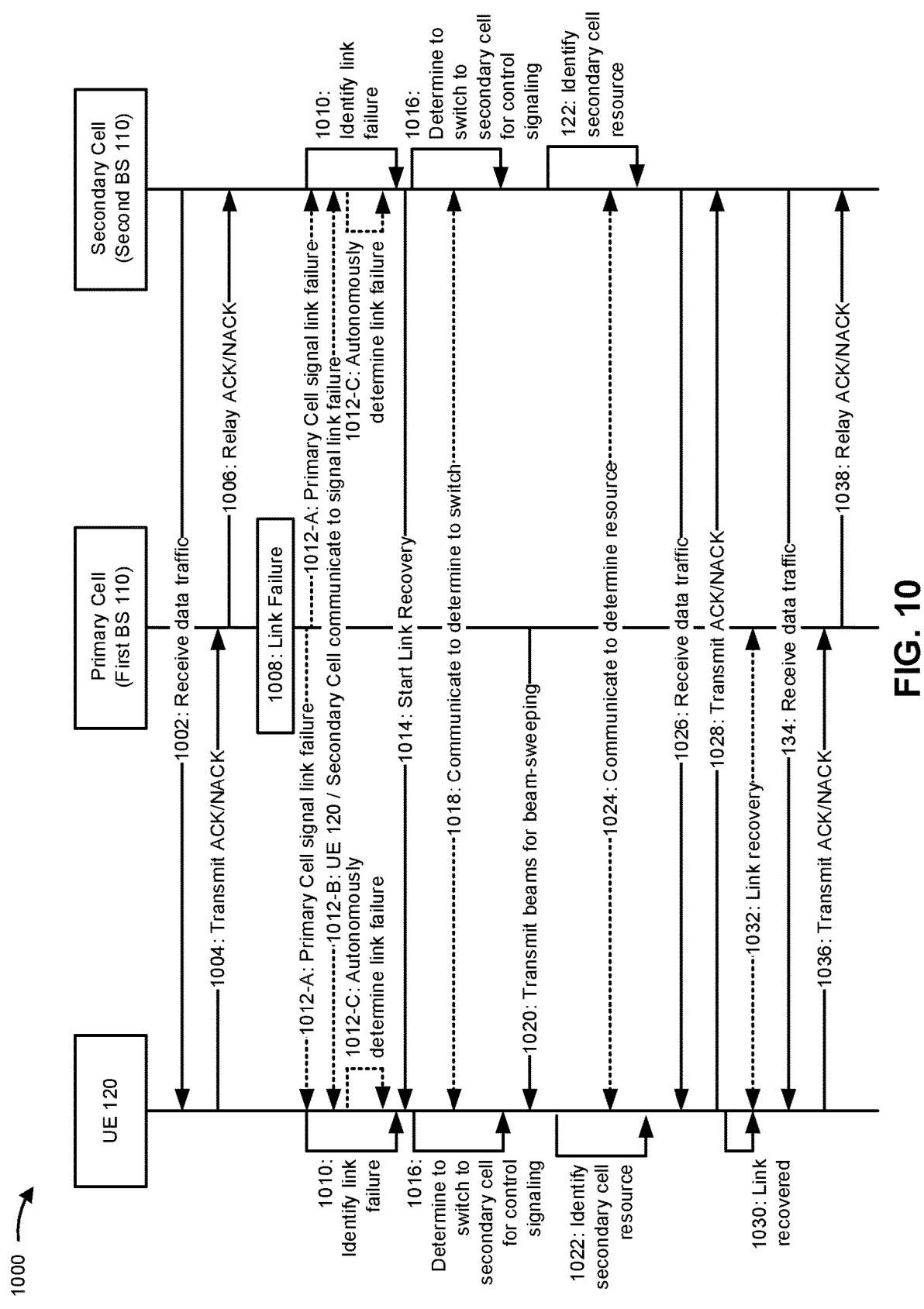
FIG. 10 is a call flow diagram illustrating an example of secondary cell control signaling after primary cell link failure, in accordance with various aspects of the present disclosure.

FIG. 10 is a call flow diagram illustrating an example 1000 of secondary cell control signaling after primary cell link failure, in accordance with various aspects of the present disclosure. As shown in FIG. 10, example 1000 includes a primary cell (e.g., first BS 110), a secondary cell (e.g., second BS 110), and a UE 120. In an aspect, the primary cell and the secondary cell may be part of the same or different BS.

At 1002, UE 120 may transmit and/or receive data traffic on the secondary cell. In another example, UE 120 may transmit and/or receive data traffic on the primary cell, both the secondary cell and the primary cell, and/or the like. In another example, UE 120 may receive other types of traffic. At 1004, UE 120 may transmit or receive control signaling on the primary cell. For example, UE 120 transmit or receive an ACK signal, a NACK signal, and/or the like. At 1006, the primary cell may relay at least some control signaling to the secondary cell. At 1008, a link failure may occur for a link between UE 120 and the primary cell.

At 1010, UE 120 and/or the secondary cell may detect the link failure. For example, at 1012-A, UE 120 and the secondary cell may each receive signaling from the primary cell indicating the link failure. As another example, at 1012-B, UE 120 and the secondary cell may communicate to indicate the link failure. For example, UE 120 may detect the link failure and signal the link failure to the secondary cell. As another example, at 1012-C, UE 120 and/or the secondary cell may autonomously detect the link failure. For example, UE 120 may fail to detect a beam of the primary cell, and may determine that a link failure has occurred.

At 1014, a link recovery procedure may start after the link failure. For example, the secondary cell may indicate to UE 120 that UE 120 is to perform a link recovery procedure. At 1016, UE 120 and/or the secondary cell may determine to switch to the secondary cell for one or more types of control signaling. For example, at 1018, UE 120 and the secondary cell may communicate, and the secondary cell indicate to UE 120 that UE 120 is to switch to transmitting control signaling on the secondary cell. At 1020, as part of the link recovery procedure, the primary cell may transmit signals, such as reference signals, on a plurality of beams to UE 120 and UE 120 may perform beam sweeping to attempt to receive signals on the beams to recovery a link.

At 1022, UE 120 and/or the secondary cell may identify a resource of the secondary cell for transmitting control signaling. In some aspects, at 1024, UE 120 and the secondary cell may communicate to determine the resource. For example, the secondary cell may determine the resource and may signal the resource to UE 120 using the secondary cell.

At 1026, after determining the resource of the secondary cell, UE 120 may transmit or receive data traffic from the secondary cell. At 1028, UE 120 may use the resource of the secondary cell for transmitting control signaling as a response two switching. For example, the control signaling may be signaling that is a response to the data traffic on the secondary cell, data traffic on the primary cell, or the like. For example, UE 120 may transmit an ACK, a NACK, and/or the like.

At 1030, UE 120 may recover the link. For example, UE 120 may recover the link based on performing beam-sweeping. In some aspects, at 1032, UE 120 and the primary cell may communicate to enable recovery of the link. At 1034, UE 120 may transmit or receive data traffic from the secondary cell. At 1036, UE 120 may transmit or receive control signaling to the primary cell based at least in part on recovery of the link and as a response to receiving the data traffic from the secondary cell. At 1036, the primary cell may relay the control signaling to the secondary cell, if the control signaling corresponds to the secondary cell.

As indicated above, FIG. 10 is provided as an example. Other examples may differ from what is described with respect to FIG. 10.

Figure 11:
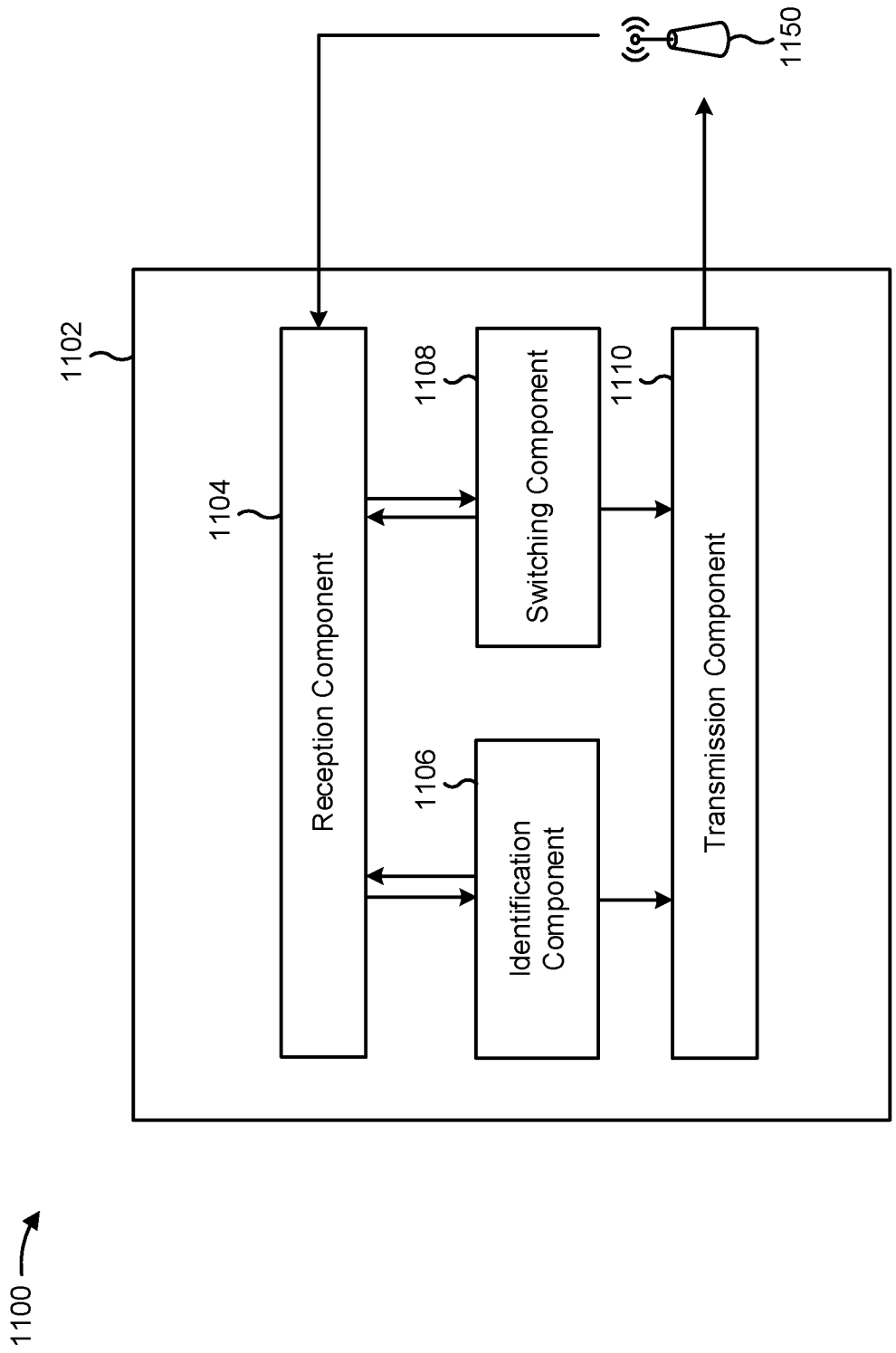
FIG. 11 is a conceptual data flow diagram illustrating an example of a data flow between different components in an example apparatus, in accordance with various aspects of the present disclosure.

FIG. 11 is a conceptual data flow diagram 1100 illustrating the data flow between different components in an example apparatus 1102. The apparatus 1102 may be a UE (e.g., UE 120). In some aspects, the apparatus 1102 includes a reception component 1104, an identification component 1106, a switching component 1108, and/or a transmission component 1108.

Reception component 1104 may monitor for signaling from a BS 1150. For example, reception component 1104 may receive signaling on a primary cell, a secondary cell, and/or the like. Based on reception component 1104 monitoring for signaling, identification component 1106 may identify a link failure in a primary cell. In this case, identification component 1106 may identify a resource in a secondary cell to initiate a beam failure recovery procedure for the link failure in the primary cell. Transmission component 1110 and reception component 1104 may communicate control signaling with BS 1150 on the resource of the secondary cell (e.g., a PUCCH resource). After signaling on the secondary cell, switching component 1108 may cause reception component 1104 and transmission component 1110 to switch from the secondary cell to the primary cell for subsequent communication.

The apparatus may include additional components that perform each of the blocks of the algorithm in the aforementioned process 800 of FIG. 8 and/or the like. Each block in the aforementioned process 800 of FIG. 8 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of components (e.g., one or more components) shown in FIG. 11 may perform one or more functions described as being performed by another set of components shown in FIG. 11.

Figure 12:
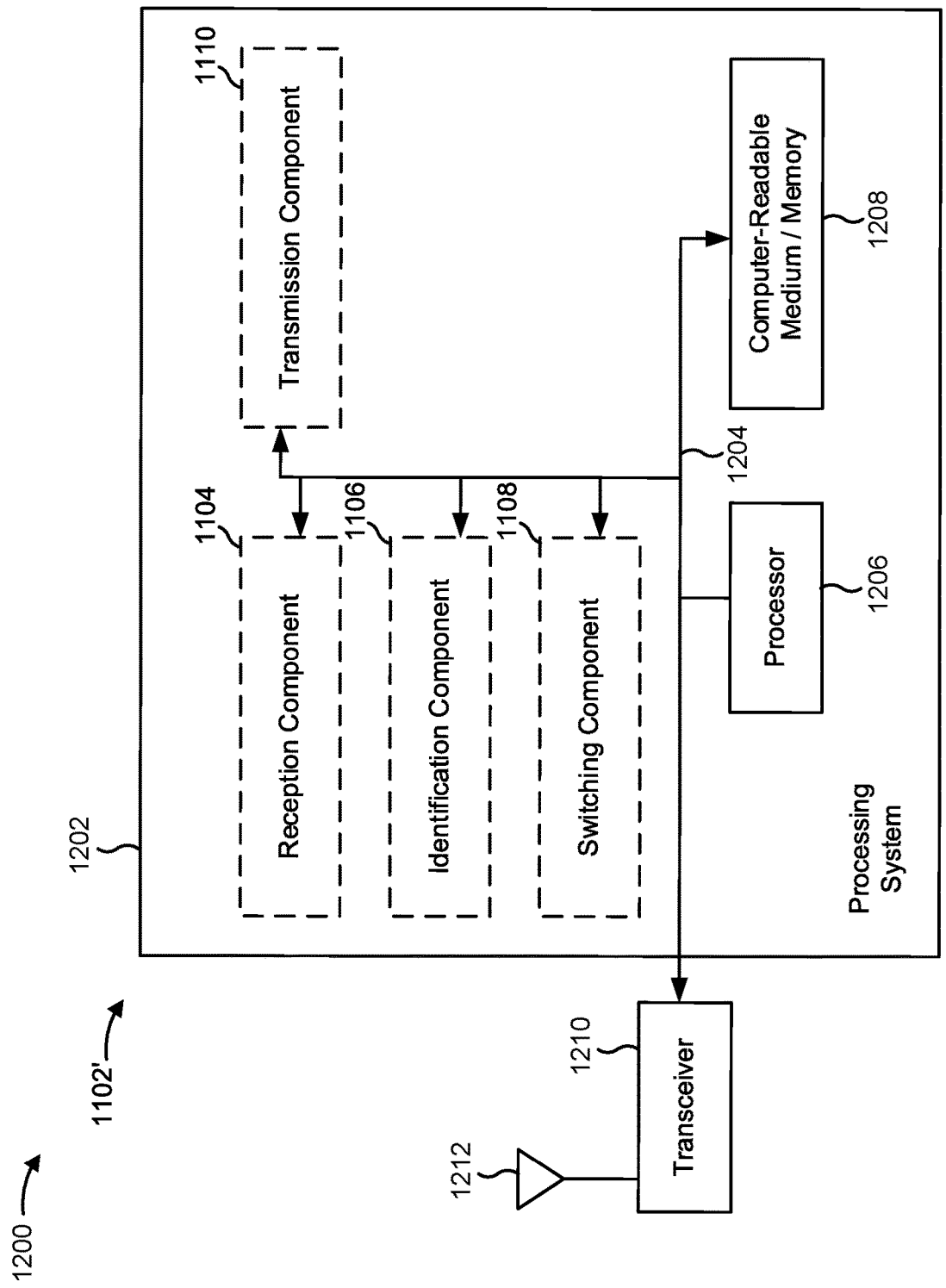
FIG. 12 is a diagram illustrating an example of a hardware implementation for an apparatus employing a processing system, in accordance with various aspects of the present disclosure.

FIG. 12 is a diagram 1200 illustrating an example of a hardware implementation for an apparatus 1102' employing a processing system 1202. The apparatus 1102' may be a UE (e.g., UE 120).

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware components, represented by the processor 1206, the components 1104, 1106, 1108 and/or 1110, and the computer-readable medium/memory 1208. The bus 1204 may also link various other circuits such as timing sources, peripherals, voltage regulators, and power management circuits, which are well known in the art, and therefore will not be described any further.

The processing system 1202 may be coupled to a transceiver 1210. The transceiver 1210 is coupled to one or more antennas 1212. The transceiver 1210 provides a means for communicating with various other apparatuses over a transmission medium. The transceiver 1210 receives a signal from the one or more antennas 1212, extracts information from the received signal, and provides the extracted information to the processing system 1202, specifically the reception component 1104. In addition, the transceiver 1210 receives information from the processing system 1202, specifically the transmission component 1110, and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described herein for any particular apparatus. The computer-readable medium/memory 1208 may also be used for storing data that is manipulated by the processor 1206 when executing software. The processing system further includes at least one of the components 1104, 1106, 1108, and/or 1110. The components may be software modules running in the processor 1206, resident/stored in the computer readable medium/memory 1208, one or more hardware modules coupled to the processor 1206, or some combination thereof. The processing system 1202 may be a component of the UE 120 and may include the memory 282 and/or at least one of the TX MIMO processor 266, the RX processor 258, and/or the controller/processor 280.

In some aspects, the apparatus 1102/1102' for wireless communication includes means for identifying, in connection with a link failure of a primary cell, a resource in a secondary cell associated with a base station (BS); means for communicating control signaling with the BS using the resource in the secondary cell as a response to the link failure of the primary cell; and/or the like. The aforementioned means may be one or more of the aforementioned components of the apparatus 1102 and/or the processing system 1202 of the apparatus 1102' configured to perform the functions recited by the aforementioned means. As described elsewhere herein, the processing system 1202 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 12 is provided as an example. Other examples may differ from what is described in connection with FIG. 12.

Figure 13:
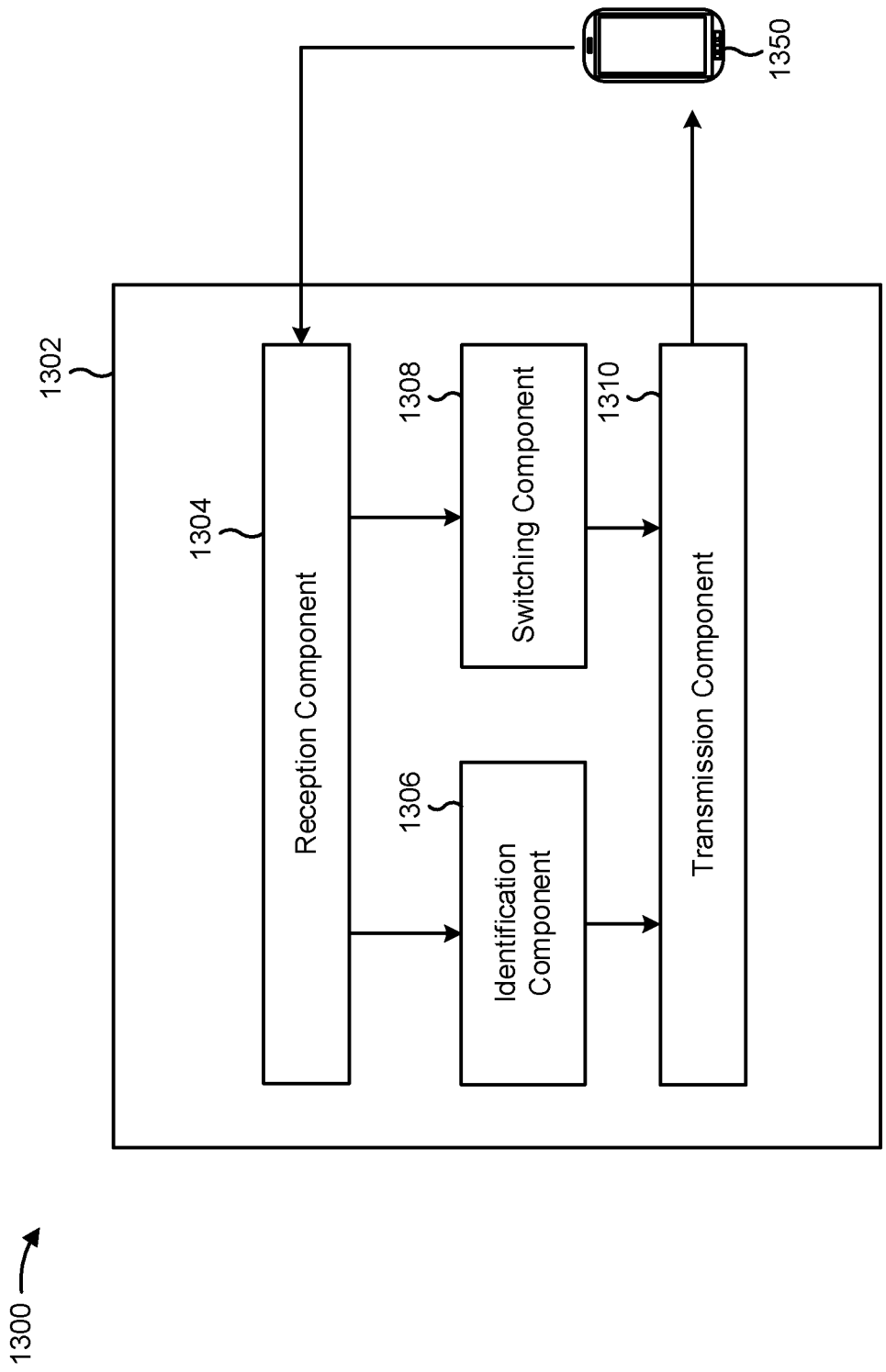
FIG. 13 is a conceptual data flow diagram illustrating an example of a data flow between different components in an example apparatus, in accordance with various aspects of the present disclosure.

FIG. 13 is a conceptual data flow diagram 1300 illustrating the data flow between different components in an example apparatus 1302. The apparatus 1302 may be a base station (e.g., base station 110). In some aspects, the apparatus 1302 includes a reception component 1304, an identification component 1306, a switching component 1308, and/or a transmission component 1308.

Reception component 1304 may monitor for signaling from a UE 1350. For example, reception component 1304 may receive signaling on a primary cell, a secondary cell, and/or the like. Based on reception component 1304 monitoring for signaling, identification component 1306 may identify a link failure in a primary cell. For example, the reception component 1304 may receive signaling on the secondary cell indicating a link failure on the primary cell. Additionally, or alternatively, the reception component 1304 may detect the link failure on the primary cell based at least in part on failing to receive, for example, feedback signaling. In this case, identification component 1306 may identify a resource in a secondary cell to initiate a beam failure recovery procedure for the link failure in the primary cell. Transmission component 1310 and reception component 1304 may communicate control signaling with UE 1350 on the resource of the secondary cell (e.g., a PUCCH resource). After signaling on the secondary cell, switching component 1308 may cause reception component 1304 and transmission component 1310 to switch from the secondary cell to the primary cell for subsequent communication with UE 1350.

The apparatus may include additional components that perform each of the blocks of the algorithm in the aforementioned process 900 of FIG. 9 and/or the like. Each block in the aforementioned process 900 of FIG. 9 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of components (e.g., one or more components) shown in FIG. 13 may perform one or more functions described as being performed by another set of components shown in FIG. 13.

Figure 14:
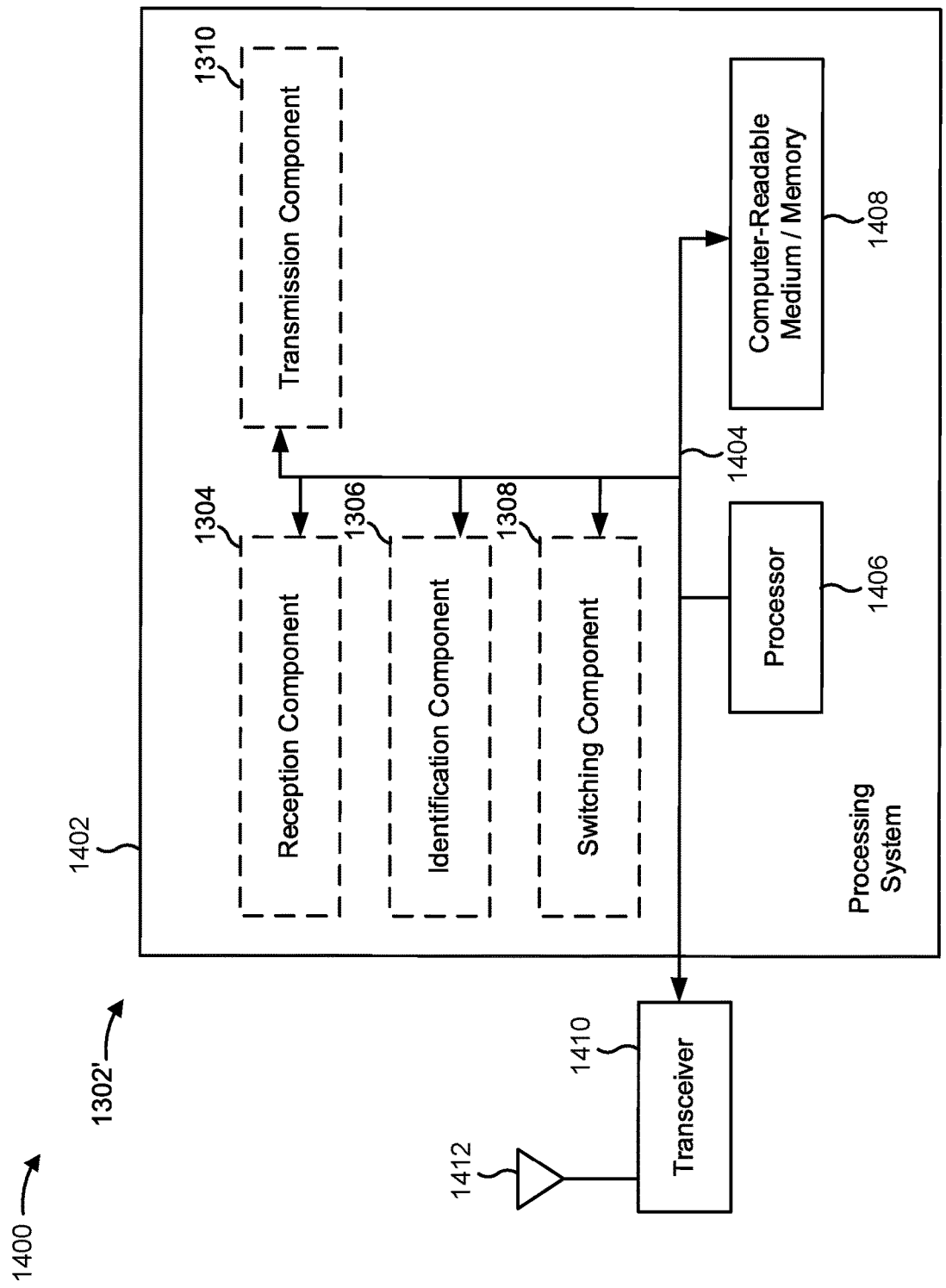
FIG. 14 is a diagram illustrating an example of a hardware implementation for an apparatus employing a processing system, in accordance with various aspects of the present disclosure.

FIG. 14 is a diagram 1400 illustrating an example of a hardware implementation for an apparatus 1302' employing a processing system 1402. The apparatus 1402' may be a base station (e.g., base station 110).

The processing system 1402 may be implemented with a bus architecture, represented generally by the bus 1404. The bus 1404 may include any number of interconnecting buses and bridges depending on the specific application of the processing system 1402 and the overall design constraints.

The bus 1404 links together various circuits including one or more processors and/or hardware components, represented by the processor 1406, the components 1304, 1306, 1308 and/or 1310, and the computer-readable medium/memory 1408. The bus 1404 may also link various other circuits such as timing sources, peripherals, voltage regulators, and power management circuits, which are well known in the art, and therefore will not be described any further.

The processing system 1402 may be coupled to a transceiver 1410. The transceiver 1410 is coupled to one or more antennas 1412. The transceiver 1410 provides a means for communicating with various other apparatuses over a transmission medium. The transceiver 1410 receives a signal from the one or more antennas 1412, extracts information from the received signal, and provides the extracted information to the processing system 1402, specifically the reception component 1304. In addition, the transceiver 1410 receives information from the processing system 1402, specifically the transmission component 1310, and based at least in part on the received information, generates a signal to be applied to the one or more antennas 1412. The processing system 1402 includes a processor 1406 coupled to a computer-readable medium/memory 1408. The processor 1406 is responsible for general processing, including the execution of software stored on the computer-readable medium/memory 1408. The software, when executed by the processor 1406, causes the processing system 1402 to perform the various functions described herein for any particular apparatus. The computer-readable medium/memory 1408 may also be used for storing data that is manipulated by the processor 1406 when executing software. The processing system further includes at least one of the components 1304, 1306, 1308, and/or 1310. The components may be software modules running in the processor 1406, resident/stored in the computer readable medium/memory 1408, one or more hardware modules coupled to the processor 1406, or some combination thereof. The processing system 1402 may be a component of the base station 110 and may include the memory 242 and/or at least one of the TX MIMO processor 230, the RX processor 238, and/or the controller/processor 240.

In some aspects, the apparatus 1302/1302' for wireless communication includes means for identifying, in connection with a link failure of a primary cell, a resource in a secondary cell; means for communicating control signaling with a user equipment (UE) using the resource for control signaling in the secondary cell as a response to the link failure of the primary cell; and/or the like. The aforementioned means may be one or more of the aforementioned components of the apparatus 1302 and/or the processing system 1402 of the apparatus 1302' configured to perform the functions recited by the aforementioned means. As described elsewhere herein, the processing system 1402 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 14 is provided as an example. Other examples may differ from what is described in connection with FIG. 14.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, based at least in part on a link failure of a primary cell, an indication to switch to communicating control signaling on a secondary cell associated with a network entity;
   identifying, based at least in part on receiving the indication, a resource in the secondary cell; and
   communicating the control signaling with the network entity using the resource in the secondary cell,
      wherein the control signaling includes one or more of an acknowledgement (ACK) or a negative acknowledgement (NACK) in response to a secondary cell physical downlink shared channel (PDSCH) communication.

2. The method of claim 1, wherein the resource in the secondary cell is a physical uplink control channel resource.

3. The method of claim 1, wherein communicating the control signaling comprises:
transmitting or receiving the control signaling.

4. The method of claim 1, wherein the control signaling is of a same type as prior control signaling, and
wherein the method further comprises:
communicating the prior control signaling with the network entity using the primary cell.

5. The method of claim 1, wherein the network entity is associated with the secondary cell, and
wherein the primary cell is associated with a different network entity.

6. The method of claim 1, further comprising:
identifying the link failure.

7. The method of claim 1, wherein the control signaling is further included in a physical downlink control channel (PDCCH) communication, a physical uplink control channel (PUCCH) communication, or a physical uplink shared channel (PUSCH) communication.

8. The method of claim 1, wherein identifying the resource in the secondary cell comprises:
determining the resource in the secondary cell based at least in part on receiving an indication of the resource in the secondary cell from the network entity or based at least in part on a stored configuration.

9. The method of claim 1, wherein communicating the control signaling comprises:
communicating the control signaling as a response to other signaling from the network entity.

10. The method of claim 9, wherein the other signaling is at least one of:
downlink data associated with the primary cell,
control signaling associated with the primary cell,
downlink data associated with the secondary cell, or
other control signaling associated with the secondary cell.

11. The method of claim 1, further comprising:
transmitting other signaling on the secondary cell to report the link failure of the primary cell.

12. The method of claim 1, further comprising:
receiving other signaling to trigger control signaling of a physical downlink control channel (PDCCH) on the secondary cell.

13. The method of claim 1, further comprising:
performing a beam failure recovery procedure in the primary cell after the link failure of the primary cell.

14. The method of claim 13, wherein performing the beam failure recovery procedure in the primary cell comprises:
requesting, in the secondary cell, to trigger the beam failure recovery procedure; and
communicating one or more other beam failure recovery procedure messages in the primary cell.

15. The method of claim 1, further comprising:
switching from using the secondary cell for communication to using the primary cell for communication.

16. The method of claim 15, further comprising:
switching to using the primary cell for subsequent control signaling based at least in part on at least one of:
recovery of the primary cell,
receipt of signaling from the network entity, or
elapse of a threshold period of time.

17. The method of claim 1, wherein the link failure of the primary cell is one of a radio link failure or a beam failure.

18. A method of wireless communication performed by a network entity, comprising:
communicating, based at least in part on a link failure of a primary cell, an indication to switch to communicating control signaling on a secondary cell;
identifying, based at least in part on communicating the indication, a resource in the secondary cell; and
communicating the control signaling with a user equipment (UE) using the resource in the secondary cell,
wherein the control signaling includes one or more of an acknowledgement (ACK) or a negative acknowledgement (NACK) in response to a secondary cell physical downlink shared channel (PDSCH) communication.

19. The method of claim 18, wherein communicating the control signaling comprises:
transmitting or receiving the control signaling.

20. The method of claim 18, wherein the control signaling is of a same type as prior control signaling communicated between the UE and the network entity or another network entity different from the network entity.

21. The method of claim 18, further comprising:
identifying the link failure of the primary cell; and
wherein identifying the resource in the secondary cell comprises:
identifying the resource in the secondary cell based at least in part on identifying the link failure.

22. The method of claim 18, further comprising:
identifying the link failure based at least in part on other signaling received via the secondary cell.

23. The method of claim 18, wherein the link failure is one of a radio link failure or a beam failure.

24. The method of claim 18, wherein the control signaling further includes at least one of: a physical downlink control signal (PDCCH) communication, a physical uplink shared channel (PUSCH) communication, or a physical uplink control channel (PUCCH) communication.

25. The method of claim 18, further comprising:
transmitting an indication of the resource in the secondary cell to the UE to identify the resource in the secondary cell.

26. The method of claim 25, further comprising:
transmitting the indication of the resource in the secondary cell based at least in part on a radio link failure report received from the UE.

27. A user equipment (UE) for wireless communication, comprising:
a memory; and
one or more processors coupled to the memory, the one or more processors configured to:
receive, based at least in part on a link failure of a primary cell, an indication to switch to communicating control signaling on a secondary cell associated with a network entity;
identify, based at least in part on receiving the indication, a resource in the secondary cell; and
communicate control signaling with the network entity using the resource in the secondary cell,
wherein the control signaling includes one or more of an acknowledgement (ACK) or a negative acknowledgement (NACK) in response to a secondary cell physical downlink shared channel (PDSCH) communication.

28. A network entity for wireless communication, comprising:
a memory; and
one or more processors coupled to the memory, the one or more processors configured to:
communicate, based at least in part on a link failure of a primary cell, an indication to switch to communicating control signaling on a secondary cell;
identify, based at least in part on communicating the indication, a resource in the secondary cell; and
communicate the control signaling with a user equipment (UE) using the resource in the secondary cell, wherein the control signaling includes one or more of an acknowledgement (ACK) or a negative acknowledgement (NACK) in response to a secondary cell physical downlink shared channel (PDSCH) communication.

29. The UE of claim 27, wherein the resource in the secondary cell is a physical uplink control channel resource.

30. The network entity of claim 28, wherein the control signaling is of a same type as prior control signaling communicated between the UE and the network entity or another network entity different from the network entity.

* * * * *